United States Patent [19]
Heinrichs et al.

[11] Patent Number: 5,634,336
[45] Date of Patent: Jun. 3, 1997

[54] INTEGRAL BRAKE APPLY SYSTEM

[75] Inventors: Jeffrey A. Heinrichs, Dayton; Neal B. Rosenblum, Kettering; Craig A. Osterday, Dayton; Timothy A. Haerr, Enon; Donald L. Parker, Middletown, all of Ohio

[73] Assignee: General Motors Corporation, Detroit, Mich.

[21] Appl. No.: 533,968

[22] Filed: Sep. 25, 1995

[51] Int. Cl.⁶ .................. B60T 13/00; F15B 9/10
[52] U.S. Cl. .................. 60/547.1; 91/376 R
[58] Field of Search .................. 60/547.1; 91/369.1, 91/376 R

[56] References Cited

U.S. PATENT DOCUMENTS

| | | | |
|---|---|---|---|
| 2,968,155 | 1/1961 | Kellogg et al. | 60/547.1 |
| 4,338,854 | 7/1982 | Margetts | 91/369 A |
| 4,519,295 | 5/1985 | Fulmer | 91/376 R |
| 4,545,206 | 10/1985 | Kobayashi | 91/376 R |
| 4,685,299 | 8/1987 | Myers et al. | 60/547.1 |
| 5,161,453 | 11/1992 | Yared et al. | 91/376 R |
| 5,305,606 | 4/1994 | Schonlau et al. | 60/547.1 |
| 5,410,880 | 5/1995 | Schluter | 60/547.1 |

FOREIGN PATENT DOCUMENTS

| | | |
|---|---|---|
| 4236148-A1 | 9/1994 | Germany . |
| WO94/00324 | 1/1994 | WIPO . |

*Primary Examiner*—Hoang Nguyen
*Attorney, Agent, or Firm*—Jeffrey A. Sedlar

[57] ABSTRACT

An integrated master cylinder and vacuum power booster provides a brake apply system wherein the master cylinder and power booster are structurally and functionally combined together to provide a uniquely packaged system. The integral system includes a master cylinder housing having a tubular extension that carries the power booster housing with at least two operating chambers. A power piston is movable by variable pressure levels between the two chambers. The power piston cooperates with a translating element carried within the tubular extension to communicate sliding movement of the power piston to the master cylinder piston.

13 Claims, 3 Drawing Sheets

INTEGRAL BRAKE APPLY SYSTEM

BACKGROUND OF THE INVENTION

The present invention relates to a master cylinder and power booster system for vehicle brake apply operation. More particularly, the invention relates to a master cylinder in combination with a vacuum power booster which uses vacuum and atmospheric pressure to provide power assist in actuating the master cylinder.

Master cylinders connectable to power boosters operating on vacuum pressure are known and generally comprise a piston in the master cylinder which is axially moveable by a push rod extending from the power booster. In the power booster, differential pressures acting on a diaphragm and support plate, which separate the booster housing into a control volume containing vacuum and a control volume containing a variable pressure, operatively move the push rod. A valve mechanism for the power booster is operable to admit atmospheric air pressure into the control volume containing variable pressure to actuate the power booster and move the master cylinder piston through the push rod.

With such a conventional construction, the master cylinder and the power booster are assembled as individual components and then bolted together. This tends to increase the overall length of the assembly which takes up limited space and spreads out the force carrying components requiring a heavier assembly.

SUMMARY OF THE INVENTION

It is an aspect of the present invention to provide a power booster of the vacuum-operated type which integrates structural support for the power booster by providing a system body that extends through the power booster and houses the master cylinder.

A power booster element of the apply system according to this aspect includes a diaphragm separating the power booster housing into at least two control volumes. The control volumes are somewhat annular in configuration and exist coaxially about the extending master cylinder. The system body according to this aspect carries the forces on the assembly, relieving the power booster housing from providing this function.

Resultant advantages include providing the ability to use lighter weight materials in constructing the power booster housing and eliminating the need to crimp power booster housing sections together. Therefore, the power booster housing is readily disassembled, increasing serviceability. Furthermore, the integral brake apply system is assembled using closed processing techniques wherein the master cylinder and power booster are assembled as a unit.

According to another aspect of the present invention, an integral power booster and master cylinder apply system is provided. Optionally, the power booster output rod and master cylinder primary piston are provided as a single component. By integrating the assembly, the master cylinder and power booster are structurally and functionally melded together to provide a uniquely packaged system.

These and other aspects are demonstrated in the following detailed description which, in summary, describes an integrated master cylinder and vacuum power booster assembly. The integrated assembly includes a master cylinder housing having a tubular extension. A bore in the master cylinder housing opens into the hollow interior of the tubular section and carries a master cylinder piston arrangement. A power booster housing is carried about the tubular extension and assists in defining two control volumes coaxially disposed about the tubular extension. A power piston is movable by variable pressure levels between the two control volumes. The power piston cooperates with a translating element carried within the tubular extension to communicate sliding movement of the power piston to the master cylinder piston arrangement.

DETAILED DESCRIPTION OF THE PRESENTLY PREFERRED EMBODIMENT

Figure 1:
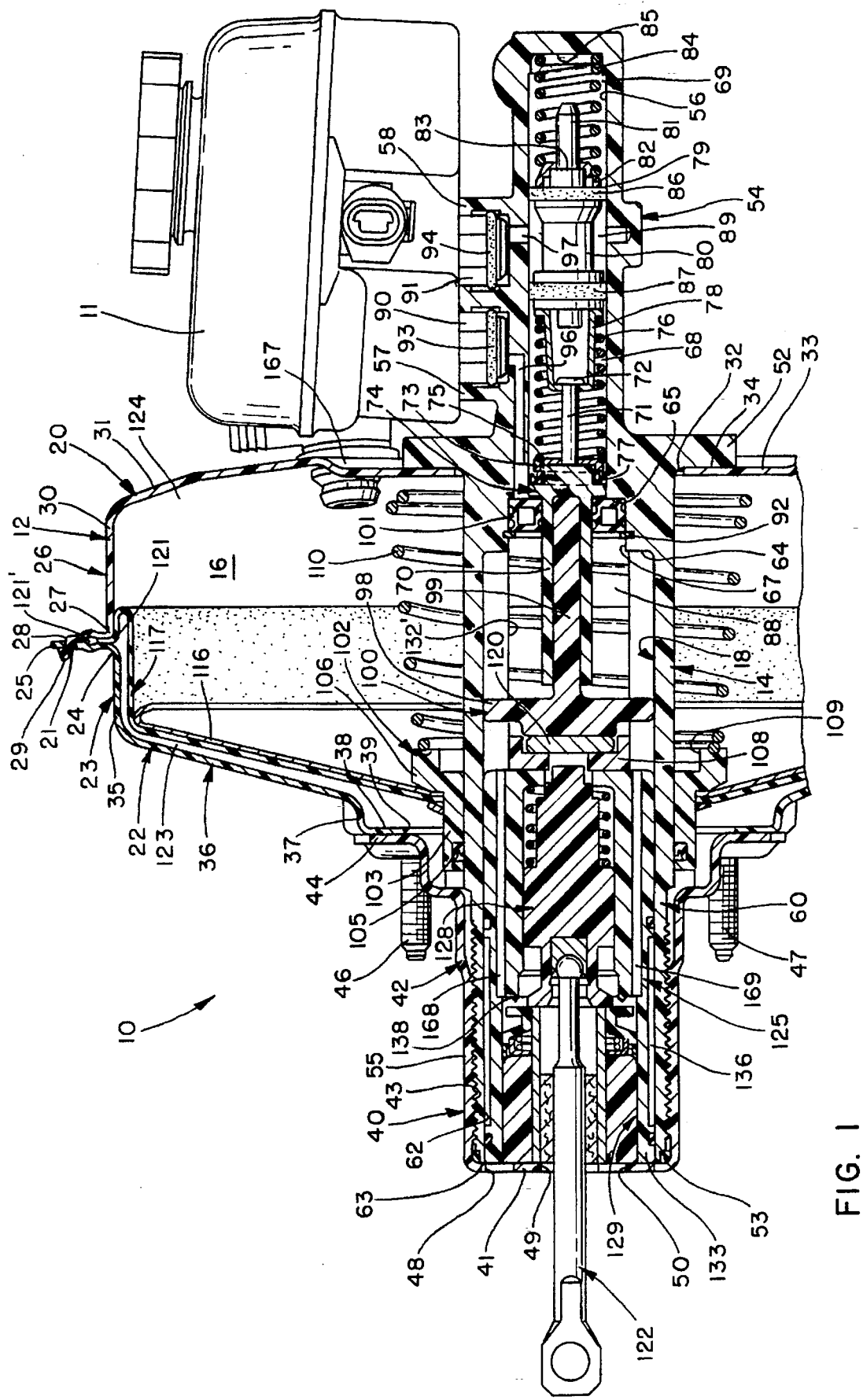
FIG. 1 is a cross-sectional view of an integral brake apply system.

Referring to FIG. 1, illustrated is an integral brake apply system 10. The power booster 12 is of the single diaphragm vacuum operated type, although it is optionally embodied as a dual diaphragm type. Power booster 12 has a substantially open internal cavity 16 which is formed by mating front housing 20 and rear housing 22. The front and rear housings 20, 22 are formed from a conventional material such as plastic or metal.

The front housing 20 includes an axially extending wall 26 which, at its rearward end 27, extends into an outer turned flange 28. The outer turned flange 28 includes a series of hooked tabs formed integrally therewith, representative of which is tab 29. The wall 26 of front housing 20 includes a forward end 30 which turns radially inwardly and forms forward wall 31. Forward wall 31 includes axial opening 32 and recessed section 33 which includes master cylinder flange seat 34.

Rear housing 22 includes outer wall 23 which at its forward end 24 integrally forms radially extending flange 25. Radially extending flange 25 mates with outer turned flange 28 of front housing 20 and includes a plurality of slot openings, representative of which is slot opening 21, that receives tab 29 in a clip-like manner, obviating the need to otherwise secure the housing sections 20, 22 together. The outer wall 23, at its rearward end 35, integrally extends into rear wall 36. The inner portion 37 of rear wall 36 forms radially extending flange 38 which defines axial opening 39.

A bracket 40 includes rearward wall 41 and an integral cylindrical axially extending wall 42 which substantially encloses the area rearward of rear housing 22. Axially extending wall 42 includes outwardly extending flange 44 which carries fasteners 46 and 47 that include threaded segments extending rearwardly from flange 44. Rearward wall 41 of bracket 40 includes air openings 48, 50 and rod opening 49. The bracket 40 provides a substantially enclosed supporting member for the axial area rearward of rear housing 22.

A unitary system body 14 extends axially through the power booster 12. Body 14 includes an annular radially extending flange 52 that mates with forward wall 31 in master cylinder flange seat 34. A forward extension of body 14 forms master cylinder housing 54 and substantially defines a piston bore 56 and includes integrally formed reservoir receptacles 57 and 58. A rearward tubular extension 60 extends through power booster 12 from axial opening 32, through axial opening 39 and extends rearwardly from opening 39 to the wall 41 of bracket 40.

The axially extending wall 42 of bracket 40 includes internal threads 43. The tubular extension 60 includes complementary external threads 55. The bracket 40 is threaded onto the tubular extension 60 with outwardly extending flange 44 engaging radially extending flange 38 of rear wall 36. A seal 53 is carried between bracket 40 and tubular extension 60 sealing the engagement between threads 43 and 55.

The tubular extension 60 includes a hollow interior and defines a first bore 62 from end 63 to step 64 and a second bore 67, along the same axis as the first bore 62, from step 64 to step 65. The tubular extension 60 completes the definition of the piston bore 56, which is defined along the same axis as the bores 62 and 67 and which extends rearward slightly past flange 52. The three bores 62, 67 and 56, form a cylindrical opening 18 with an open diameter reducing step-wise from the end 63 thereof, providing a means for inserting the various internal components.

The piston bore 56 slidably carries a tandem piston arrangement including primary piston 74 and secondary piston 79. The primary piston 74 separates the cylindrical opening 18 into primary high pressure chamber 68 and primary low pressure chamber 88. The secondary piston defines secondary low pressure chamber 89 in cylindrical opening 18 and separates secondary high pressure chamber 69 therefrom.

The primary piston 74 is arranged in a subassembly that includes a spring retainer 78 which is slidably retained on post 71 by means of head 72. A second spring retainer 73 is positioned about primary piston 74 and engages annular shoulder 75. A spring 76 is carried between spring retainers 73 and 78 and is compressible therebetween. The subassembly also includes a seal 77 carried on primary piston 74. Primary piton 74 includes a cylindrical extension 70 that extends rearwardly through bore 67 and into bore 62. A seal 101 is positioned in the tubular extension 60 adjacent the piston bore 56 and maintains fluid separation between the hollow interior of the tubular extension 60 and the piston bore 56. The seal 101 is maintained in position in bore 67 of tubular extension 60 by a retaining ring 92.

Secondary piston 79 is also carried in piston bore 56 forward of primary piston 74 and is engaged by spring retainer 78 of the primary piston subassembly. The secondary piston 79 is spool shaped and includes intermediate undercut 80. Secondary piston 79 includes piston extension 81 which carries a spring retainer 82 about annular shoulder 83. A spring 84 extends between spring retainer 82 and forward end 85 of piston bore 56. Secondary piston 79 includes primary seal 86 and secondary seal 87.

A fluid reservoir 11 includes cylindrical connecting extensions 90 and 91 which mate with reservoir receptacles 57 and 58 of master cylinder housing 54, respectively. The connections between the extensions 90, 91 and the receptacles 57, 58 are maintained in a fluid tight condition by annular grommets 93 and 94. The reservoir 11 carries a supply of fluid for operation of the associating vehicle brake system by means of the integral brake apply system 10.

System body 14 includes compensation port 96 which extends between reservoir receptacle 57 and primary low pressure chamber 88. Also included is compensation port 97 which extends between reservoir receptacle 58 and secondary low pressure chamber 89. The compensation ports 96 and 97 provide a means of routing fluid between the reservoir 11 and piston bore 56.

A reaction piston 100 is slidably received in bore 62 of cylindrical opening 18. Reaction piston 100 includes disk element 98 and piston rod element 99. Piston rod element 99 is matingly received within cylindrical extension 70 of primary piston 74 so that reaction piston 100 moves therewith as a unit. Spring 76 operates to bias primary piston 74 and reaction piston 100 rearwardly.

Figure 2:
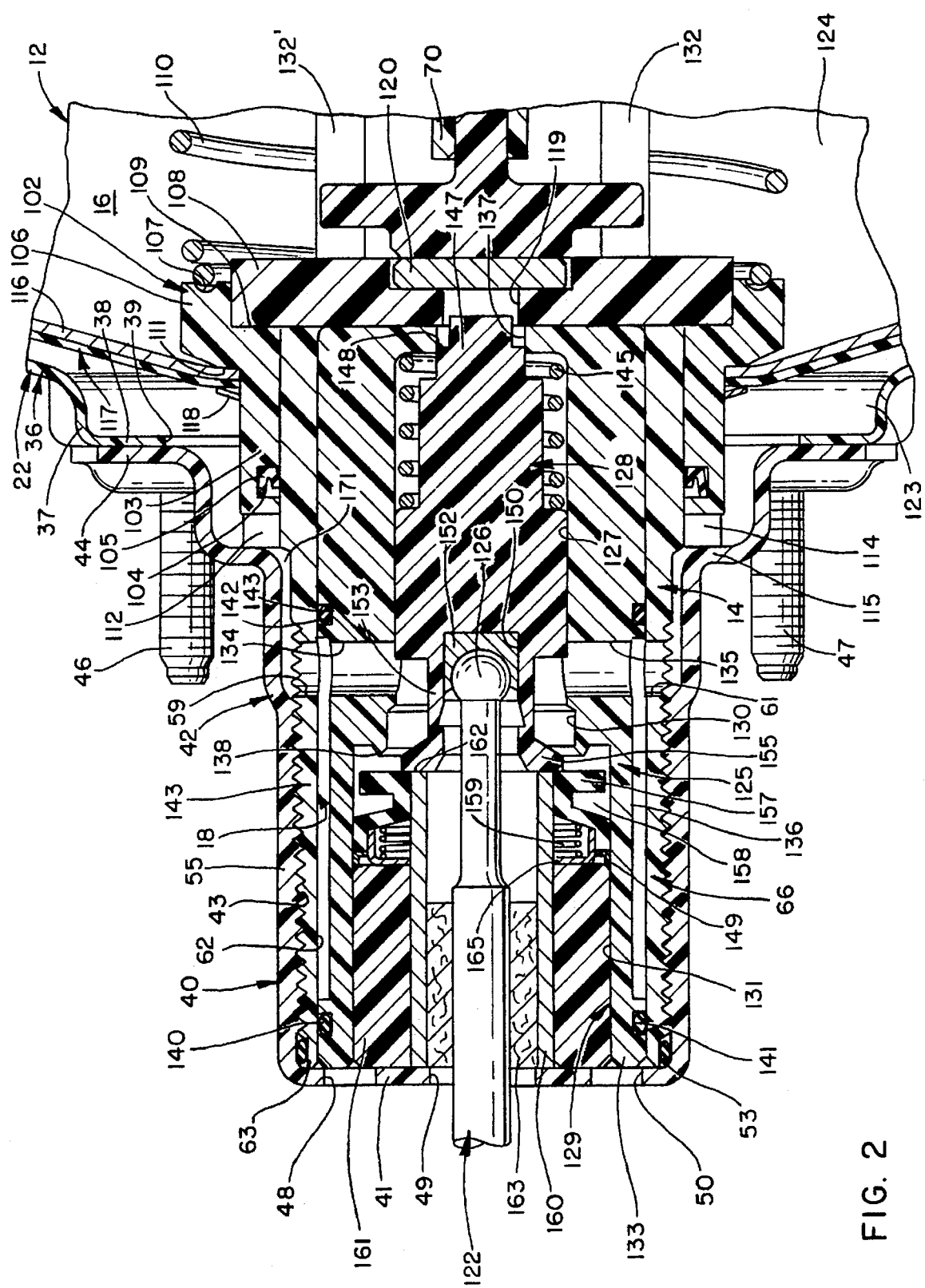
FIG. 2 is a detail illustration of the control valve area of FIG. 1.

Referring additionally to FIG. 2, a power piston 102 is slidably received on tubular extension 60. The power piston 102 includes a cylindrical segment 103 which has annular groove 104 carrying seal 105 to provide an air tight seal against tubular extension 60. Power piston 102 also includes forward annular leg 106 which is spaced away from tubular extension 60. Forward annular leg 106 includes integral spring seat 107 and provides a seat for transmission element 108 within recess 109.

The power piston 102 is slidable forwardly and rearwardly on tubular extension 60 in response to actuation of the power booster 12. A spring 110 extends between spring seat 107 and forward wall 31 of front housing 20. Spring 110 operates to return power piston 102 to the at rest position of FIG. 2 where stop legs 112 and 114 contact annular radially extending element 115 of bracket 40.

A rigid annular support plate 116 and mating flexible diaphragm 117 engage shoulder 111 of power piston 102 and are retained thereagainst by retainer 118. The diaphragm 117 and support plate 116 are more fully illustrated in FIG. 1. The diaphragm 117 includes an outer rim 121 with an annular bead 121' which is sealingly clamped between outer turned flange 28 of front housing 20 and radially extending flange 25 of rear housing 22.

The power piston 102 transfers movement of the diaphragm 117 and support plate 116 to the reaction piston 100 by means of transmission element 108 and reaction disk 120. A pair of lateral slots 132 and 132' are provided in tubular extension 60 which provides a means of guiding transmission element 108 during longitudinal movement. The slot 132 also permits the transfer of movement from the power piston 102 to the reaction elements which are carried within the tubular extension 60.

Diaphragm 117 separates internal cavity 16 into control volume 123 and control volume 124. The diaphragm 117 and the support plate 116 provide power assistance to the manual application of force into the system by means of push rod 122.

To this end, a vacuum pressure exists in control volume 124 and a variable pressure exists in control volume 123. The pressure in control volume 123 is varied by selectively providing an alternate means of communication between control volume 123 and either control volume 124 or the atmosphere. This supplies the motive force for selectively moving power piston 102 forward against the force of spring 110.

A variable pressure in control volume 123 selectively creates a force on the diaphragm 117. The support plate 116 applies the force from the diaphragm 117 to the shoulder 111 of power piston 102. In response, power piston 102 compresses spring 110 causing power piston 102 to slide along the tubular extension 60, forcing transmission element 108, reaction disk 120 and reaction piston 100 to move to apply force to the master cylinder primary piston 74.

A valve housing 125 is carried within tubular extension 60 and extends between rearward wall 41 of bracket 40 and transmission element 108. Valve housing 125 includes internal longitudinal bores 127, 130 and 131 which are defined along a common axis. The three bores 127, 130 and 131, form a cylindrical opening 129 with an open diameter reducing step-wise from the end 133 thereof.

Lateral holes 134 and 135 extend through valve housing 125 and communicate with bore 127. The lateral holes 134 and 135 are positioned in substantial alignment with lateral holes 59 and 61 which extend through tubular extension 60. In addition, a longitudinal hole 137 extends through the front of valve housing 125. The valve housing 125 includes an annular recess 136 which maintains communication between the lateral holes 134, 135 and the lateral holes 59, 61.

Valve housing 125 carries a seal 140 in annular groove 141 rearward of holes 134 and 135. Valve housing 125 also carries a seal 142 in annular groove 143 forward of holes 134 and 135. The seals 140 and 142 sealingly bear against the tubular extension 143. An integral annular valve seat 138 is formed as a part of valve housing 125.

A valve body 128 is slidably disposed in bore 127 for controlling the admittance of atmospheric air into power booster 12 and is biased rearwardly by spring 145. Valve body 128 includes forward extension 147 which is sized to be received within longitudinal hole 137 with shoulder 148 engageable with transmission element 108 about opening 119. Valve body 128 also includes cavity 150. Enlarged end 126 of push rod 122 is captured within cavity 150 by retainer 152. When sufficient force is applied to push rod 122, valve body 128 moves forward, compressing spring 145. Shoulder 148 is engageable with transmission element 108 to actuate the master cylinder.

Valve body 128 includes a rearward extension 153 with an integral annular valve element 155. Valve element 155 is shown seated against floating valve element 157. Floating valve element 157 is disposed in chamber 158 which is defined in bore 131 between sleeve 160 and valve housing 125. Sleeve 160 is maintained in position by a spacer 161 and carries filter 163.

Floating valve element 157 is biased toward valve element 155 by a spring 159. Spring 159 is maintained adjacent to spacer 161 by an annular spring retainer 165. Floating valve element 157 is held adjacent to tubular extension 60 by retainer 149. When valve body 128 is in the unapplied position, valve element 155 forces floating valve element 157 to compress spring 159 and to be seated against end 162 of sleeve 160.

When not actuated, the system, as illustrated, applies vacuum pressure to the control volumes 123 and 124. Check valve 167 is conventionally connected to a vacuum source and communicates with the cavity 16 and more specifically, with control volume 124. In the unactuated position, vacuum is communicated to control volume 123 through lateral slots 132 and 132', passages 168 and 169, past valve seat 138, into cavity 158, through lateral holes 134, 135, 59 and 61, passage 171 and opening 39. Since the vacuum pressure is applied to both control volumes 123 and 124, spring 110 forces power piston 102 rearwardly.

The variable pressure in control volume 123 is increased through the operation of valve body 128 by push rod 122 which compresses spring 145, moving valve element 155 to separate from floating valve element 157. Separation allows atmospheric pressure to enter the control volume 123 through sleeve 160 and thus creates a pressure differential across the diaphragm 117. Atmospheric air entering the power booster 12 travels through filter 163, past valve element 155, through cavity 158, lateral holes 134, 135, 59 and 61, passage 171 and opening 39 into control volume 123. In coordination, spring 159 forces floating valve element 157 against valve seat 138, interrupting the application of vacuum to control volume 123 and preventing atmospheric air from entering control volume 124.

Upon release, when force on push rod 122 is removed, spring 145 forces valve element 155 to reengage floating valve element 157, interrupting the flow of atmospheric air into power booster 12 and vacuum flow out through vacuum check valve 167 re-equalizes pressure on opposing sides of diaphragm 117 in control volumes 123 and 124, as previously described.

Figure 3:
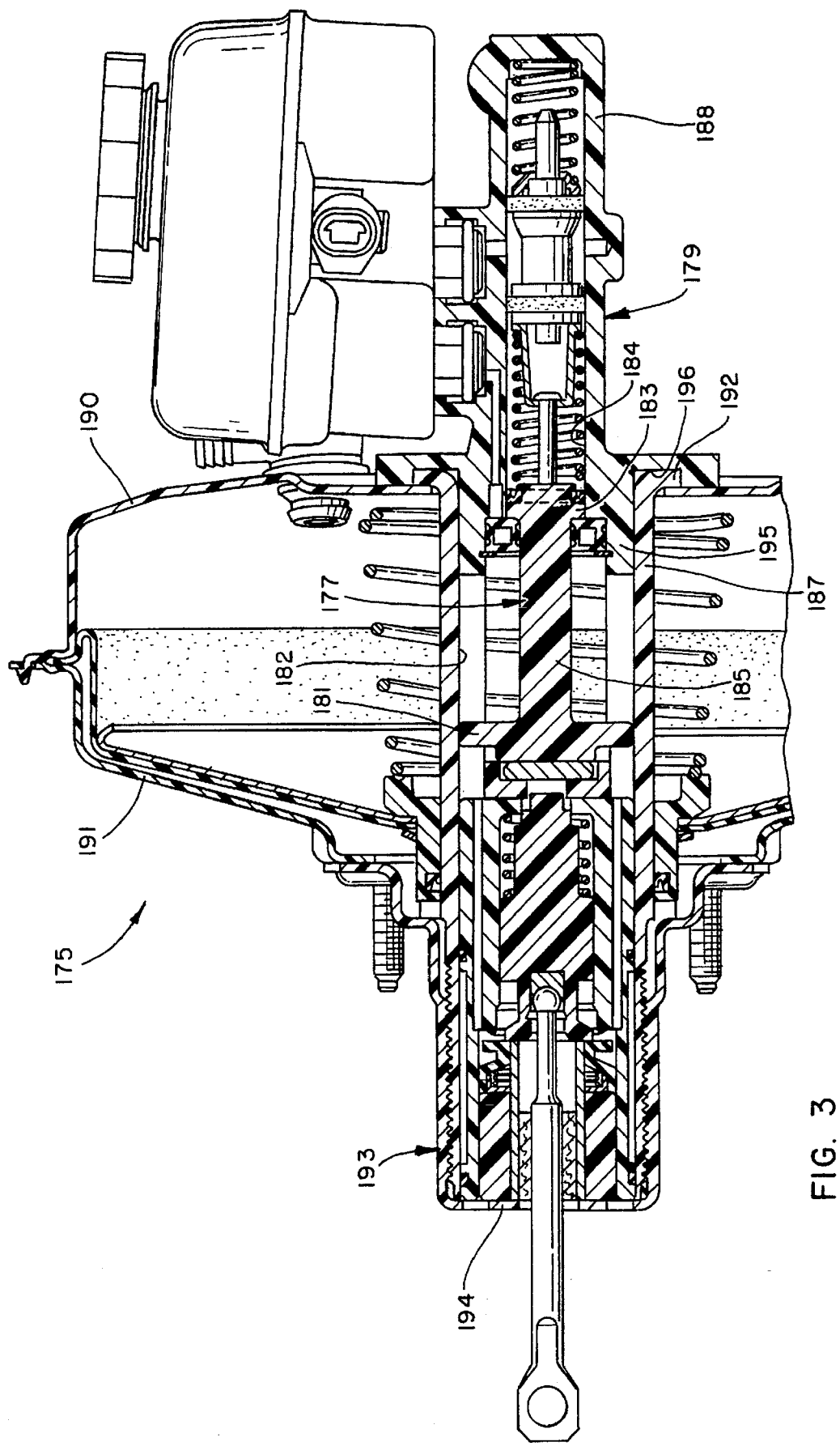
FIG. 3 is a cross-sectional view of an integral brake apply system.

Referring to FIG. 3, an alternate embodiment of the present invention is illustrated with a construct similar to that described with reference to FIGS. 1 and 2. Differing aspects of the integral brake apply system 175 include a one-piece reaction and primary piston 177 and a two-piece system body 179.

The reaction and primary piston 177 includes integral reaction piston element 181 which is slidably carried in bore 182, primary piston element 183 which is slidably carried in bore 184 and piston rod 185 which extends between reaction piston element 181 and primary piston element 183.

The system body 179 includes tubular extension 187 and master cylinder housing 188. Tubular extension 187 extends through front housing 190 and rear housing 191 providing support therefor. An outwardly turned flange 192 engages the front housing 190 and the tubular extension 187 extends rearwardly to wall 194 of bracket 193. Master cylinder housing 188 is connected to tubular extension 187 with extension 195 matingly received within tubular extension 187 and outwardly turned flange 192 matingly received within annular recess 196. The operational characteristics of the embodiment of FIG. 3 are substantially identical to those of the embodiment of FIGS. 1 and 2.

What is claimed is:

1. An integral brake apply system comprising:

a unitary body including a master cylinder housing and a tubular extension with a hollow interior with a piston bore in the master cylinder housing opening into the hollow interior of the tubular extension;

a master cylinder piston slidably carried in the piston bore;

a power booster housing carried about the tubular extension;

a power piston slidably carried by the tubular extension cooperating with a translating element carried within the tubular extension and being capable of communicating sliding movement of the power piston to the master cylinder piston:

an air control valve body carried in the hollow interior of the tubular extension: and a mounting bracket engaging the tubular extension, wherein the unitary body includes a flange adjacent the tubular extension and wherein the power booster housing includes a front housing and a rear housing connected to the front housing by clips, the front and rear housings held together by the flange which engages the front housing and the mounting bracket which engages the rear housing.

2. An integral brake apply system comprising:

a unitary body including a master cylinder housing with an internal piston bore and a tubular extension with a hollow interior;

a master cylinder piston assembly carried in the piston bore;

a fluid reservoir carried on the master cylinder housing;

an air control valve carried in the hollow interior;

a floating control valve carried in the hollow interior;

a power piston slidably carried on the tubular extension; and a power booster housing securely carried on the tubular extension.

3. An integral brake apply system according to claim 2 further comprising a diaphragm and a cooperating support plate separating the power booster housing into first and second control volumes wherein the first control volume is connectable to a vacuum power source and wherein the second control volume is alternately connected to the vacuum power source through the floating control valve and to atmosphere through the air control valve.

4. An integral brake apply system comprising:

a unitary body including a master cylinder housing, a tubular extension and an annular flange;

a first power booster housing section having a first opening through which the tubular extension extends and having a wall engaging the annular flange about the first opening;

a second power booster housing section having a second opening through which the tubular extension extends; and a bracket threaded onto the tubular extension and engaging the second vacuum booster housing section about the second opening.

5. An integral brake apply system according to claim 4 wherein the first power booster housing section includes a hooked flange and wherein the second power booster housing section includes slotted flange engaging the hooked flange.

6. An integral brake apply system according to claim 4 wherein the front housing section and the rear housing section are fixed on the tubular extension by the annular flange and the bracket.

7. An integral brake apply system according to claim 4 wherein the master cylinder housing includes a bore and further comprising a master cylinder piston slidably carried in the bore.

8. An integral brake apply system according to claim 7 further comprising a power piston slidably carried by the tubular extension.

9. An integral brake apply system according to claim 8 further comprising a rod element carried within the tubular extension communicating sliding movement of the power piston to the master cylinder piston.

10. An integral brake apply system according to claim 9 wherein the rod element is part of the master cylinder piston.

11. An integral brake apply system according to claim 10 wherein the tubular extension includes a hollow interior and further comprising an air control valve body carried in the hollow interior of the tubular extension.

12. An integral brake apply system according to claim 11 further comprising a seal positioned in the tubular extension adjacent the piston bore and maintaining fluid separation between the hollow interior of the tubular extension and the piston bore.

13. An integral brake apply system according to claim 12 wherein the seal slidably engages the rod element.

* * * * *